Patented Oct. 24, 1950

2,527,378

UNITED STATES PATENT OFFICE 2,527,378

PROCESS OF MAKING GLYCOLS

Eugene R. Bertozzi, Trenton, N. J., assignor to Thiokol Corporation, Trenton, N. J., a corporation of New Jersey No Drawing. Application September 23, 1946, Serial No. 698,864

7 Claims. (Cl. 260—608)

This invention relates to a process of making glycols having the general formula

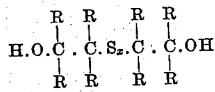

It is known that some of the species of this genus can be obtained by the reaction of alkaline mono or polysulfides with chlorhydrins. The processes based on the use of chlorhydrins have certain disadvantages. For example, the chlorine in the chlorhydrins and the cation of the alkaline sulfides are completely lost by being converted into corresponding halides. That causes a substantial economic loss. Moreover there are certain operational disadvantages connected with the use of halohydrins or chlorhydrins as, for example, storage difficulties. The halohydrins are quite corrosive unless substantially anhydrous and the production and maintenance of anhydrous conditions entails expense and practical difficulties.

In accordance with the generic principles of the invention, a glycol having the general formula

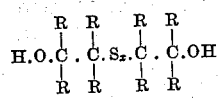

is made by reacting an organic compound having the general formula

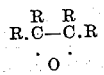

with a reagent selected from the group consisting of alkaline polysulfides and mixtures of alkaline monosulfides and alkaline polysulfides, where $x$ is a numeral varying from 1 to 6, R is selected from the group consisting of hydrogen, alkyl radicals, aryl radicals and aralkyl radicals. The term "alkaline polysulfides" as employed herein includes the disulfides.

The commonest species of the genus represented by the formula

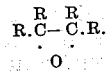

is ethylene oxide. There are, however, numerous other species illustrated by formulae as follows:

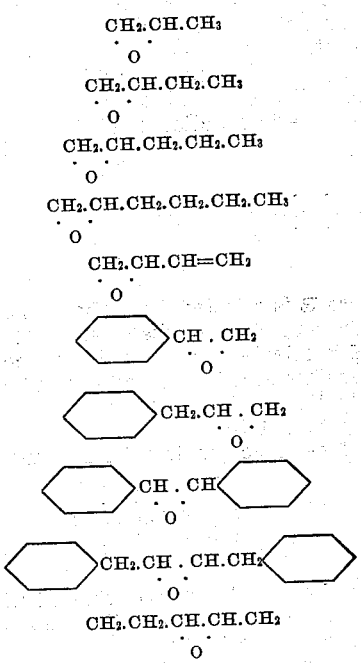

All of the above compounds can be regarded as alkene oxides because the alkene oxide group (as such or substituted) is common to all.

Alkaline sulfides in general are used. These include the monosulfides, disulfides and sulfides where the rank of the sulfur atom is greater than two and up to six, the sulfur atom being in combination with a positive atom or group, e. g., alkali or alkaline earth metals, ammonium, substituted ammonium, etc. Examples of the alkaline sulfides that may be used (taking sodium merely as an example of the positive atom or group) are $Na_2S$, $Na_2S_2$, $Na_2S_4$, $Na_2S_{1.1}$, $Na_2S_{1.5}$, $Na_2S_{1.8}$, $Na_2S_{2.4}$, $Na_2S_{4.5}$, $Na_2S_5$, etc.

The alkaline sulfide may be expressed by the general formula $AS_{1\ to\ 6}$ where A is the positive atom or group. Alkaline hydrosulfides behave in a manner similar to the monosulfides. The fractional values of the sulfur atoms shown above represent mixtures of sulfides the use of which produces mixed glycols. When these mixtures are produced from a single compound having the general formula

the glycols in the resulting mixture will have the same empirical formula except as to the number of sulfur atoms. For example, by reacting ethylene oxide with $Na_2S_{1.5}$, there will be obtained an approximately equimolecular mixture of OH.Et.SS.Et.OH and OH.Et.S.Et.OH and the mixture will have the empirical composition O.Et.$S_{1.5}$.Et.OH.

The process has a number of advantages, does not involve the serious loss of materials above referred to and is, therefore, more economical. It also has practical operational advantages because compounds having the general formula

e. g., the alkene oxides, are in general more stable and available than the halohydrins and are not, like the latter, corrosive. Moreover some of the alkene oxides exist at ordinary temperatures as or can readily be converted into a gas. For example, ethylene oxide exists as a gas at ordinary temperatures and may readily be brought into contact with an alkaline sulfide solution.

The generic reaction may be written as follows:

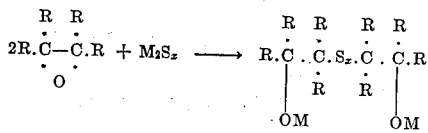

Where R is selected from the group consisting of hydrogen, alkyl radicals and aralkyl radicals and M is selected from the groups consisting of alkali metals, ammonium, substituted ammonium, and alkaline earth metals and $x$ is a numeral varying from 1 to 6.

The free glycol having the formula

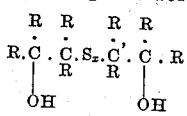

may be obtained by substituting M with hydrogen; e. g., by treatment with acid or dilution with water or alcohol.

The generic nature of the reaction is further illustrated by the following equations and examples:

(1) 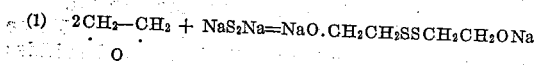

(2) 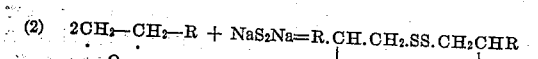

or

or

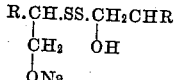

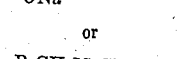

isomers (3) 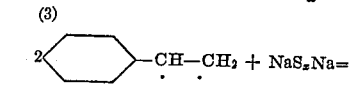

isomers

EXAMPLE I

*Preparation of dithio diethylene glycol*

Into 152 ml. of a 2.55 molar sodium disulfide solution in water in a 250 ml. cylinder was passed ethylene oxide at 30–45° C. until the polysulfide color had practically gone. The increase in weight of the system was 35 grams. A positive heat of reaction was observed. To the resulting homogeneous solution 25 per cent sulphuric acid solution (25% $H_2SO_4$ by weight) was added until a pH 6 was reached. As acid was added, a very light colored oil separated to the top. The wet oil on separation weightd 68 grams. This is about equal to the weight of wet oil if chlorhydrin had been used. The product was identified as dithiodiglycol by sulfur analysis, solubility and density characteristics and refractive index. The refractive index obtained was 1.5610 at 20°. That of dithiodiglycol obtained from chlorhydrin has a refractive index of 1.5645 at 20°. The sulfur assay was 39%. That calculated for pure dithiodiglycol was 41.5%.

EXAMPLE II

Proceed as in Example I substituting propylene oxide for the ethylene oxide. In this case, dithiodipropylene glycol is obtained.

EXAMPLE III 10 parts by volume of styrene oxide were intimately mixed with 50 parts by volume of a 2 molar aqueous solution of sodium disulfide by agitating these reactants at a temperature of about 80° C. After about 15 minutes during which time the temperature first rose and then fell to about 50° C., the product was permitted to stand. It separated into two layers, an oily layer and an aqueous layer. On cooling to room temperature, the oily layer solidifies and is composed essentially of isomers as indicated in the equation set forth above.

EXAMPLE IV

Proceed as in Examples I, II and III respectively, substituting an alkaline sulfide in which the sulfide has a rank higher than 2.

The use of the sulfides having a rank higher than two has the advantage that the alkaline hydroxide produced as one of the products of the reaction is converted into an alkaline polysulfide. Therefore, any given quantity of alkaline polysulfide in which the sulfur has a rank higher than two will react with a larger proportion of alkene oxide than is the case with the alkaline disulfides.

EXAMPLE V

Proceed as in Examples I, II and III respectively using a mixture of alkaline monosulfide and disulfide in any desired proportions.

In the procedures of Example V, the products produced are monothiodiglycols whereas in Examples I to IV the products obtained are di- or other polythiodiglycols. The procedures of Examle VI produce mixtures of mono and dithiodiglycols.

The above examples will be sufficient to show how compounds in general having the formula

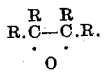

may be reacted with alkaline sulfides.

The sulfide, hydrosulfide or polysulfide reagent may be dissolved in any polar solvent such as water or any of the lower alcohols.

What is claimed is:

1. Process of producing an organic sulfur-containing reaction product having present therein at least a substantial proportion of a glycol compound having the formula

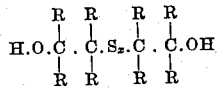

where $x$ is a numeral varying from 2 to 6 and R is selected from the group consisting of hydrogen, alkyl radicals, aryl radicals and aralkyl radicals, which comprises reacting an organic compound having the general formula

where R has the same meaning as before, with a reagent selected from the group consisting of alkaline polysulfides and mixtures of alkaline monosulfides and alkaline polysulfides, the reagent being dissolved in a solvent of the group consisting of water and the lower alcohols.

2. Process of making a dihydroxy dialkylene sulfide which comprises reacting an alkene oxide with an alkaline sulfide in aqueous solution.

3. Process of making a dihydroxy dialkylene polysulfide which comprises reacting an alkene oxide with an alkaline polysulfide in aqueous solution, the sulfur of said alkaline polysulfide having a rank greater than 1.

4. Process of making a dihydroxy dialkylene disulfide which comprises reacting an alkene oxide with an alkaline disulfide in aqueous solution.

5. Process of making a dihydroxy diethylene polysulfide which comprises reacting ethylene oxide with an alkaline polysulfide in aqueous solution, the sulfur of said polysulfide solution having a rank greater than 1.

6. Process of making dihydroxy diethylene disulfide which comprises reacting ethylene oxide with an alkaline disulfide in aqueous solution.

7. Process of making a dihydroxy-dialkylene monosulfide which comprises reacting an alkylene oxide with an alkaline monosulfide in aqueous solution.

EUGENE R. BERTOZZI.

REFERENCES CITED

The following references are of record in the file of this patent:

Sjoberg: "Berichte der Deut. Chem. Ges.," vol. 75B (1942), page 24.

Tchitchibabine: "Compt. Rend.," 1935, pages 242–244.

Sjoberg: "Berichte," vol. 75B (1942), page 15.